United States Patent [19]

Matsuo et al.

[11] 3,962,398
[45] June 8, 1976

[54] PROCESS FOR PRODUCING HEAT RESISTANT MATERIALS

[75] Inventors: Kazuto Matsuo, Imari; Michiya Araki; Tomoyuki Matsugu, both of Yatsushiro; Takahito Mikami, Nishinomiya, all of Japan

[73] Assignee: Kohjin Co., Ltd., Tokyo, Japan

[22] Filed: Aug. 21, 1974

[21] Appl. No.: 499,156

Related U.S. Application Data

[62] Division of Ser. No. 416,801, Nov. 19, 1973.

[30] Foreign Application Priority Data

Nov. 21, 1972 Japan.............................. 47-116207

[52] U.S. Cl......................... 264/184; 260/45.75 K; 260/45.75 D; 260/876 R; 260/890; 260/897 C; 264/185

[51] Int. Cl.²...................... D01F 6/00; D01F 6/14; C08F 29/24

[58] Field of Search......... 260/899, 45.75 K, 876 R, 260/884, 890, 29.6 UA, 897 C; 264/184, 185

[56] References Cited
UNITED STATES PATENTS

| | | | |
|---|---|---|---|
| 2,843,562 | 7/1958 | Caldwell .................... | 160/29.6 UA |
| 2,879,256 | 3/1959 | Wooten et al. .................... | 260/884 |
| 2,895,786 | 7/1959 | Schlack............................... | 260/899 |
| 3,111,370 | 11/1967 | Okamura et al. ........... | 260/29.6 UA |
| 3,859,390 | 1/1975 | Tsuji et al............................ | 260/899 |
| 3,887,676 | 6/1975 | Okamura et al..................... | 260/184 |
| 3,907,958 | 9/1975 | Tsuji et al............................ | 260/184 |

FOREIGN PATENTS OR APPLICATIONS 44-12851  6/1969  Japan.......................... 264/DIG. 29

*Primary Examiner*—Jay H. Woo
*Attorney, Agent, or Firm*—Toren, McGeady and Stanger

[57] ABSTRACT

A method for producing fibers and films comprising emulsion polymerizing a polyvinyl alcohol derivative having sulfone or sulfate group with a chlorine-containing vinyl monomer, adding the thus formed emulsion to a matrix of polyvinyl alcohol and then co-agulating the mixture into a film or fiber. The resulting polymeric compositions are composed of polyvinyl alcohol, the sulfone or sulfate-containing polyvinyl alcohol and the chlorine containing vinyl polymer, in which a part of the chlorine-containing vinyl polymer is grafted onto the polyvinyl alcohol derivative. The emulsions used possess excellent stability and the films and fibers therefrom possess excellent heat resistance.

17 Claims, No Drawings

PROCESS FOR PRODUCING HEAT RESISTANT MATERIALS

This is a Divisional application of Ser. No. 416,801, filed Nov. 19, 1973, pending.

BACKGROUND OF THE INVENTION

1. Field of the Invention

The present invention relates to fibers and films having excellent heat resistance, mechanical properties and luster prepared by conventional wet or dry processes. More particularly, the fibers and films are prepared from a composition consisting of an aqueous emulsion which consists either of a polymer or copolymer obtained by polymerizing vinyl chloride and/or vinylidene chloride or vinyl chloride and/or vinylidene chloride and another monomer in the presence of polyvinyl alcohol derivatives containing a sulfone or sulfate group and a catalyst, in the substantial absence of an emulsifier, and a matrix consisting essentially of polyvinyl alcohol.

In the following descriptions, polyvinyl chloride, polyvinylidene chloride and polyvinyl alcohol are abbreviated as PVC, PVdC and PVA, respectively. Except for the description in the Examples, the expression "polyvinyl chloride" may represent "polyvinyl chloride and/or polyvinylidene chloride or a copolymer with vinyl chloride and/or vinylidene chloride".

2. Description of the Prior Art

For preparing emulsion spun fibers of PVC and PVA as the major constituents, U.S. Pat. No. 3,111,370, incorporated herein by reference, describes a process in which a PVC emulsion, prepared by emulsion polymerization in an aqueous PVA solution using a polymerization catalyst and a large amount of emulsifying agent, is mixed with an aqueous solution of PVA as the matrix and the resulting mixture is used for spinning fibers.

The fibers and films prepared by the above process are adequately hydroscopic and excellent in softness and antiinflammability because they contain both hydrophobic PVC and hydrophilic PVA as the major constituents. But, on the other hand, those properties, such as, heat resistant, mechanical and luster are inevitably lowered due to the large amount of emulsifying agent which is used in the emulsion polymerization and remains as a contaminant in the resulting fibers and films.

In the process of emulsion polymerization, an anionic emulsifying agent is generally used which is rather unstable when heated. The thermal decomposition products therefrom accelerate thermal decomposition of the PVC which is poorly heat resistant. This leads to discoloration of the produced fibers and films.

On the other hand, the low molecular weight emulsifying agent that is contained as one of the constituents in the processed fibers and films can deleteriously affect the mechanical properties, transparency, and luster of the products. Thus, the presence of such a low molecular substance may promote the nonuniformity in the fine structure of the product.

SUMMARY OF THE INVENTION

After intensive investigations to overcome the above-noted drawbacks in the known processes, the present inventors have discovered an unexpected process for producing an aqueous emulsion. In this process, the use of a polyvinyl alcohol derivative containing a sulfone or a sulfate group in the preparation of the aqueous emulsion results in producing a highly stable emulsion of PVC having a smaller particle size than those prepared by the conventional methods. The inventors have further investigated the conditions under which PVA is added as a matrix to the aqueous emulsion to prepare a liquid for spinning and, as a result, fibers prepared by wet spinning and films prepared from the liquid exhibit better heat resistance, mechanical properties, and luster than the prior art products.

The aqueous emulsion used in the present invention can be prepared essentially without the addition of any emulsifying agent by using, in addition to a polymerization catalyst, a PVA derivative containing a sulfone or sulfate group in the emulsion polymerization of the vinyl chloride and/or vinylidene chloride or a mixture of vinyl chloride and/or vinylidene chloride and another monomer. The emulsion thus obtained is mechanically stable and contains particles having a small particle size.

The present invention thus relates to fibers and films which are prepared by mixing the above mentioned PVC emulsion with an aqueous PVA solution or an aqueous mixture of PVA with another water soluble high molecular substance to obtain a highly stable spinning or film-making liquid from which spun fibers or films are prepared by a wet process, and by applying thermal stretching or other thermal treatments to the fibers and films according to known processes for spinning and film-making.

Thus, in contrast with the conventional processes where PVA is a dispersion agent and an emulsifying agent are necessary to obtain emulsions formed from fine particles that are stable both mechanically and in storage, the present invention applies a PVA derivative containing a sulfone or sulfate group in the emulsion polymerization. The PVA derivative of the present invention acts not only as a dispersion agent, but also, as an emulsifying agent, to yield an aqueous emulsion for spinning fibers or film-making which is stable both mechanically and in storage and contains particles of a small size.

More particularly, the spinning composition of the present invention is composed of:

a. A polyvinyl alcohol derivative containing from about 0.5 to 20% by moles of sulfone or sulfate groups, in an amount of from about 1.5 to 20% by weight of the total polymer components in the emulsion;

b. a catalyst;

c. one or more chlorine-containing vinyl monomers, such as, vinyl chloride and vinylidene chloride; or c'. the above chlorine-containing vinyl monomers and another monomer, the amount of vinyl monomers containing no chlorine being not more than 15% by weight; and d. a matrix composed of polyvinyl alcohol as the major constituent in an amount from about 40 to 250% by weight of the total polymer components in the emulsion. The polymerization degree of PVA is 900 to 2500 and the polymerization degree of PVA derivatives is 100 to 1000.

The present process is carried out by emulsion polymerizing components (a) and (b) with (c) or (c') in an aqueous emulsion and adding (d) to it.

The above mixture may be formed into fibers and films by conventional wet or dry processes.

The composition as spun is composed of PVA, PVA derivative containing the sulfone or sulfate groups and the chlorine-containing vinyl polymer, a part of the chlorine-containing vinyl polymer being grafted onto said PVA derivative.

DESCRIPTION OF THE PREFERRED EMBODIMENTS

The PVA derivatives used in the present invention containing a sulfone or sulfate group are:

1. substances produced from those copolymers, which are prepared from vinyl acetate and polymerizable monomers containing a sulfone group, such as, vinyl sulfonic acid, allylsulfonic acid, methallylsulfonic acid, methacrylate propylsulfonic acid and the salts including sodium salts and potassium solts thereof obtained by saponifying the product in an alkaline or acid solution containing an alcohol, such as, methanol and ethanol.

For example, in case of sodium vinylsulfonate, a mixture of 20% by weight of vinylacetate and sodium vinyl-sulfonate dissolved in a liquid of methanol and water (1:1) is polymerized at 50°C for 20 hours, the thus obtained polymerization product is put in water to separate and dry polymers. Then a 40% by weight methanol solution of the polymers is prepared, a small amount of caustic soda is added thereto, heated at a maximum temperature of 30°C, saponified for 6 hours to remove methanol and dried. Although a general formula is not appropriate, the product can be expressed by the formula below when vinylsulfonic acid or salts including sodium salts and potassium salts thereof are used.

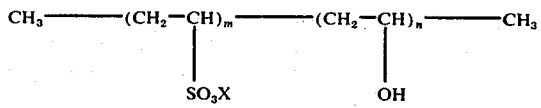

2. substances produced by a well-known reaction in which PVA is first treated with bromine or iodine followed by heating in an aqueous solution of sodium hydrogen sulfite, expressed by the following formula,

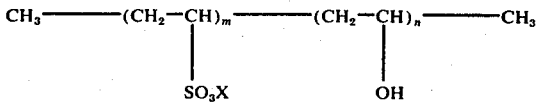

For example, 0.03% bromine water is added to PVA to prepare an about 5% aqueous solution. This solution is heated at 20°C for 8 hours to separate reaction products then 5% sodium hydrogen sulfite is added thereto and reaction is made to take place at 95°C for 5hours to obtain PVA derivative.

3. a substance called sulfuric acid esterified polyvinyl alcohol which is produced, for example, by adding one part of PVA powder to 20 parts of aqueous solution containing 30% by weight of sulfuric acid and 15% by weight of sodium sulfate, and by heating at 80°C for 2 hours, and is expressed by the following formula, -continued

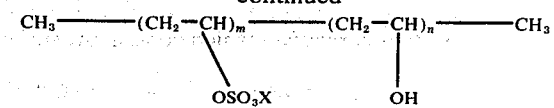

In the above formulae, X stands for a hydrogen or an alkali metal atom, such as sodium and potassium, and $m$ and $n$ stand for arbitrary integers. ($100 \leq m+n \leq 1000$, $m/(m+n) \times 100 = 0.5$ to $20$).

The sulfone or sulfate group content of the PVA derivatives employed in the present invention should be within the range described below. Thus, the effect is insufficient for a sulfone or sulfate group content of less than 0.5% by moles. The higher the percentage, the finer are the particles of the emulsion and the lower the viscosity. However, at a content of more than 20% by moles, a pratically colorless PVA derivative of high quality containing sulfone or sulfate groups is difficult to produce. Therefore, a sulfone or sulfate content in the range of from about 0.5 to 20% by moles is best. Further, considering the filterability and the ease in the operations to prepare the fibers and films of the spinning liquid and the film-making liquid, the content should be preferably in the range of from about 0.7 to 10% by moles. The object of this invention can be fully attained within these ranges.

The viscosity of the aqueous emulsion is remarkably affected by the degree of polymerization of the PVA derivative used in the emulsion polymerization that contains the sulfone or sulfate groups. The viscosity of the aqueous emulsion is also related to the viscosity of the spinning liquid which is prepared by adding a aqueous solution of PVA alone or a mixture of PVA with another water soluble high molecular substance to said aqueous emulsion. Thus, the higher is the viscosity of the emulsion, the more viscous is the spinning liquid. To obtain an adequate value of viscosity of the spinning liquid, the favorable degree of polymerization of the PVA derivatives containing sulfone or sulfate groups in the present invention is from about 100 to 1000, preferably from about 200 to 700. The polymerization degree of the PVA derivative means $m + n$ defined on pages 7 and 8. The same applies to the film-making liquid of this invention.

The appropriate amount of the PVA derivatives containing sulfone or sulfate groups to be used in the present invention differs depending on the sulfone or sulfate content and the degree of polymerization of the PVA derivatives. Usually the amount should be from about 1.5 to 20%, and preferably from about 1.5 to 10% by weight, based on the weight of the polymer components in the aqueous emulsion. Only a minimal effect can be expected with less than 1.5%, and, for larger values exceeding this range, the viscosity of the aqueous emulsion becomes excessively high.

In the emulsion polymerization using the PVA derivatives containing sulfone or sulfate groups are described above, conventional methods of emulsion polymerization can be used where the monomers are added either at once or continuously under stirring and heated in the presence of water and a polymerization catalyst.

The filterability of the spinning liquid that is prepared by adding an aqueous solution of PVA as the matrix to the aqueous emulsion can be improved by using a small amount of an emulsifying agent in or after the preparation of the aqueous emulsion. For this reason, a small amount of an emulsifying agent may be used in parallel to the use of PVA derivatives which contain the sulfone or sulfate groups.

The emulsifying agents used in this invention, if necessary, include a single member or a combination of more than two members of anionic surfactants, such as, sulfates of higher alcohols, alkylarylsulfonates, alkylsulfosuccinate and salts of fatty acids, and further a mixture of the above emulsifying agents with a nonionic surfactant, such as, polyethyleneglycolalkyl ether, polyethyleneglycol alkylaryl ether and polyethyleneglycol fatty acid ester.

The polymerization catalysts of this invention include water soluble peroxides, such as, potassium persulfate, ammonium persulfate and hydrogen peroxide which are used either alone or in the form of a redox catalyst that is formed by the parallel use of a reducing agent such as sodium hydrogen sulfite, ferrous sulfate, and l- or d-ascorbic acid.

The amount of the catalyst is 0.02 to 1% by weight to the polymeric monomer when the peroxide is used in single as in the ordinary emulsion polymerization, and when the redox catalyst is used, 0.02 to 1% by weight of peroxide to the polymeric monomer and a reducing agent in an amount of from 10 to 100% by weight to the peroxide are used.

The chlorine-containing monomers used in the present invention include, besides vinyl chloride and vinylidene chloride mentioned above, allylchloride and methallylchloride. The emulsion polymerization is carried out using one or more members of the chlorine-containing vinyl monomers alone or a mixture of the same with another vinyl monomer selected from the group consisting of acrylonitrile, styrene, vinyl acetate, propionic acid vinyl ester and acrylic acid ester.

The amount of the other monomer is usually not more than 15% by weight on the base of the total monomers. When the amount is beyond 15% by weight, the particle size of the emulsion will be coarse, and the mechanical stability of the emulsion tends to lower, and also the spinning liquid obtained by the addition of PVA as matrix lowers in its stability.

To determine the graft efficiency of compounds prepared by the present process, an aqueous emulsion which is prepared by emulsion polymerization, for example, of vinyl chloride in an aqueous solution of a PVA derivative that contains sulfone or sulfate groups is destroyed by a freezing treatment and a solid material is separated (referred to as homopolymer graft material). Extraction of this material with hot water and the resulting dried residue with tetrahydrofuran leaves a graft component which is insoluble in hot water and tetrahydrofuran.

The graft efficiency defined by the following formula, $$\text{Graft efficiency} = \frac{\text{Graft component} \times 100}{\text{Homopolymer} + \text{graft matter}}$$

is usually from about 5 to 50%, depending on the species of the PVA derivatives containing sulfone or sulfate groups, the concentration in the aqueous solution, and the nature of the polymerizable monomer.

The emulsion prepared by the process of this invention exhibits high mechanical stability as shown below and can be stored for a long period of time.

A PVA derivative containing sulfone groups was prepared by saponifying sodium vinylsulfonate-vinyl acetate copolymer containing 2.0% by moles of sodium vinylsulfonate, having a saponification degree of 98.5% by moles and degree of polymerization of 350. To mixtures each consisting of 10.9 parts of the said PVA derivative, 0.26 part of potassium persulfate, 460 parts of desalted water and 218 parts of vinyl chloride, four different quantities of sodium lauryl sulfate, 0, 0.48, 0.96 and 1.92 parts, were added. Each mixture was placed and heated in an autoclave for 8 hours understirring with the maximum temperature of polymerization at 50°C. The aqueous emulsions produced contained fine particles and exhibited good mechanical stability as shown in the table below. For reference, PVA having a polymerization degree of 350 and a saponification degree of 99.0% by moles was used instead of the PVA derivative containing sulfone groups and the operation throughout the emulsion polymerization was the same.

| | Amount of emulsifying agent (part) | | | | | | | |
|---|---|---|---|---|---|---|---|---|
| | 0 | | 0.48 | | 0.96 | | 1.92 | 9.6 |
| | A | B | A | B | A | B | A | B | B |
| Average diameter of particles(mµ) | 154 | Coarse | 83 | 156 | 62 | 107 | 41 | 82 | 40 |
| Mechanical stability of emulsion(min.) | >240 | 1 - 2 | >240 | 2 - 3 | >240 | 3 - 4 | >240 | 4 - 5 | >240 |
| Storage stability | good | Gelatinized | good | Unstable | good | good | good | good | good |
| Viscosity of emulsion (cp) | 7.0 | — | 7.2 | — | 7.6 | 15.2 | 7.9 | 13.1 | 12.2 |

A: Material of this invention
B: Reference

Remarks:
1. Average diameters were measured with an electron microscope.
2. Mechanical stability of the emulsion was estimated with a Shimazu gear pump Model OBZ 6P (0.6 ml/revolution). Values were expressed by the time in minutes in which the gear pump stopped turning. The larger the value, the better the mechanical stability. When the gear pump did not stop in 240 min., the estimation was expressed by ">240". For an emulsion to be used commercially, the mechanical stability must be larger than 240 min.

3. Storage stability of the emulsion was designated as "good" when substantially no change was observed in viscosity, pH and appearance for a week at 30°C.

4. Viscosity of the emulsion was measured with a rotatory viscosimeter at 25°C.

As seen in the table, when an emulsifying agent was not applied, the PVA used for a reference gave emulsions which were poor in mechanical stability and apt to be gelatinized in storage and, therefore, cannot be used as an emulsion for an emulsion spinning liquid. Even if an emulsifying agent was applied, an amount of 0.48 to 1.92 parts was not sufficient to improve the mechanical stability so as to enable the emulsion to be used commercially as an emulsion spinning liquid.

On the other hand, the process of this invention, even without use of an emulsifying agent, provided emulsions which were unexpectedly excellent in both mechanical stability and storage stability. Further, when a small amount of emulsifying agent was applied, the particle size was finer than those in references prepared under identical conditions. It is evident that the present invention can provide emulsions much more stable than those from conventional processes.

The matrix of this invention can be prepared from either PVA alone or a mixture of PVA with another water soluble high molecular substance. The applicable high molecular substances include synthetic high polymers, such as, polyacrylamides and methylolated polyacrylamides and natural high polymers, such as, starch, hydroxyethyl cellulose and methylcellulose, and the amount thereof to be mixed must be less than 50% by weight to the PVA. The polymerization degree and the saponification degree of PVA used as matrix may be respectively 900 to 2500 and more than 95 mole % depending on the kind of the water emulsion or the mixing proportion of the water emulsion to the matrix PVA. The matrix PVA is added to the water emulsion as 14 to 20 weight % aqueous solution.

The aqueous emulsion prepared in accordance with the present invention by the emulsion polymerization of polymerizable monomers of which the most part is of chlorine-containing monomers in an aqueous solution of the PVA derivative containing sulfone or sulfate groups can be thoroughly mixed with the matrix component, hold excellent stability as shown by the time variation of viscosity, and also possesses good filterability and spinnability.

The water soluble high polymer of which PVA is the most dominant component to be added as the matrix to the aqueous emulsion should be added in the amount of from about 40 to 250% by weight to the polymer components in the aqueous emulsion, to obtain a good result. If the amount of matrix exceeds this value, the emulsion becomes too dilute to be continuous, while the effect of the matrix becomes incomplete for an amount of matrix below the lower limit of the range.

The spinning liquid prepared according to the process of this invention is then extruded in the form of fiber or film into a coagulating solution of sodium sulfate, following the ordinary process of emulsion spinning, and the products are treated, if necessary, by wet thermal treatment, washing with water, drying, stretching, thermal treatment and the conventional acetal treatment. The products thus obtained exhibit better mechanical properties, heat resistance and have more luster with a transparent appearance than similar products prepared by the known processes. In addition, they can be dyed with any of the basic, dispersion and sulfide dyes, supplying colored product with improved vividness.

As an example, a mixture consisting of 10.9 parts of the PVA derivative, which contained sulfone groups and had 98.5% by moles of saponification degree and 350 of polymerization degree and was obtained by saponification of a sodium vinylsulfonate-vinyl acetate copolymer containing 2.0% by moles of sodium vinylsulfonate, 0.26 part of potassium persulfate, 460 parts of desalted water, 218 parts of vinyl chloride and two different amounts, 0 and 1.92 parts, of sodium laurylsulfate, was heated at 50°C for 8 hours under stirring in an autoclave, to complete the polymerization. The PVC emulsions obtained, of which the solid concentrations were 31.5 and 31.8% by weight (polymer components were 31.5 and 31.5% by weight), showed excellent stability of the emulsion.

To the PVC emulsion thus prepared, a 15% aqueous solution of PVA (1700 of polymerization degree, 99.0% by mole of saponification degree) was added as matrix so that the amount of PVA was 66% by weight to the total polymer components in the emulsion (total solid matter in the emulsion minus emulsifying agent and potassium persulfate, or in other words PVA derivative plus chlorine-containing vinyl polymer, a part of the chlorine-containing vinyl polymer being grafted onto the PVA derivative) and the resulting mixture was thoroughly mixed and debubbled to obtain a spinning liquid.

Following the ordinary process of emulsion spinning, after filtration, the spinning liquid above was spun in an aqueous solution of sodium sulfate to prepare fibers, submitted to wet thermal treatment, washing with water, a drying, a stretching, a thermal treatment and finally an acetal treatment with formaldehyde to obtain fibers of 2 denier. The heat resistance of the fibers was comparatively tested with the fibers for reference which was prepared in the same process except that, in place of the PVA derivative containing sulfone groups, a PVA of the degree of polymerization 350 and the degree of saponification 99.0% by moles was used and the emulsifying agent was increased to 9.6 parts. Results are shown in the following table.

| Item | Sample | Emulsifying agent (part) | | |
|---|---|---|---|---|
| | | 0 Sample for test | 1.92 Sample for test | 9.6 Reference |
| Heat resistance (Coloring by heat) | 140°C × 120' | 73 | 72 | 66 |
| | 150°C × 60' | 61 | 59 | 44 |
| | 160°C × 30' | 58 | 55 | 42 |
| | 180°C × 15' | 45 | 36 | 20 |

Remark: The coloring by heat was expressed by the whiteness observed after thermal treatment in a Geer type Ageing tester. Larger values represent better results.

As is readily seen in the table, the known process which employs PVA provides products of more remarkable heat coloration than the process of the present invention does where no emulsifying agent is used, and the latter process, even when a small amount of an emulsifying agent is applied, proves to give products of more excellent heat resistance than conventional processes do.

Further, the uniform fine structure of cross section of fibers is an achievement of this investigation. In the cross sectional structure of fibers obtained by the well known processes of emulsion spinning, observation with an optical microscope does not, but careful observation with an electron microscope does show a dual structure forming skin and core as distinct as in the PVA fibers produced by the wet spinning process. On the other hand, however, the fibers produced by the process of this invention have a uniform cross-sectional structure and are lustrous due to the absence of the emulsifying agent in the composed matter, so that dyed products therefrom show extremely clearer tones of color relative to products obtained by conventional methods and which have a dual structure. Needless to say, to add to the spinning liquid of this invention conventional additives, such as, various pigments, frosting agent to remove luster, stabilizer, or a fire-retardant, each in a rather small amount, by a generally recognized method, remains within the scope of the present invention.

As the fire-retardant used in the present invention, stannic acid and tin oxides ($SnO, SnO_2$) are most effective, which are usually used in an amount of not more than 5% by weight to the polymeric composition.

Further, the scope of the present invention is not restricted by the operation of the treatments and the conditions thereof, such as, the wet thermal treatment, washing with water, drying, stretching, thermal treatment and converting into the acetal, which are applied, if necessary, to the fibers and films produced by a generally recognized process from the spinning liquid of this invention.

As has been described above, the present invention provides fibers and films, which are prepared from the material by emulsion, spinning and film-making process respectively, and have better heat resistance, mechanical properties and luster than those prepared by conventional known processes. The material is composed of a water soluble high molecular substance where PVA is the major constituent and those substances which include a chlorine-containing polymer, such as, PVC and PVdC, or a copolymer from these chlorine-containing monomers or a copolymer of said chlorine-containing monomers with other monomers.

The fibers of this invention obtained by the above process can be spun into yarn by ordinary methods and used for producing various fiber products including non-woven cloth in the same manner as for other general-purpose synthetic fibers.

EXAMPLE 1

A mixture consisting of 10.9 parts of a sulfone group containing PVA derivative of the degree of saponification 98.5% by moles and the degree of polymerization 350 which had been obtained by saponifying sodium vinylsulfonatevinyl acetate copolymer containing 2.0% by moles of sodium vinylsulfonate, 0.26 part of potassium persulfate, 460 parts of desalted water and 218 parts of vinyl chloride was placed in an autoclave, and the polymerization was carried out under stirring for 8 hours at the temperature range where the maximum was 50°C. The polyvinyl chloride emulsion thus obtained contained 31.5% by weight of solid matter (or 31.5% by weight of polymer components in the emulsion), and the physical properties were as follows: the viscosity at 25°C was 7.0 cp, average diameter of particles was 154m$\mu$, , mechanical stability was greater than 4 hours, the grafting efficiency was 18.6% and the storage stability was such that no change was observed after 6 months of storage.

A thorough mixture of 28.5 parts of the said PVC emulsion and 60 parts of a 15% aqueous solution of PVA (1700 polymerization degree, 99.2% by moles saponification degree) was maintained at 80°C, debubbled to make a spinning liquid, where, the polymer component in the matrix amounted to 100.2% to the polymer component in the emulsion. The spinning liquid of this invention thus obtained was compared with respect to stability with reference liquids for spinning, including one in which the PVA derivative containing sulfone groups was replaced by PVA, and ones in which 0.96 and 9.6 parts of sodium laurylsulfate were used as an emulsifying agent and each PVC emulsion was polymerized in the same manner. Results are shown below.

|  | This invention | Reference (1) | Reference (2) | Reference (3) |
| --- | --- | --- | --- | --- |
| Emulsifying agent | 0 | 0 | 0.96 part | 9.6 parts |
| Storage Stability of PVC emulsion | Good | Gelatinized | Good | Good |
| Mechanical stability of PVC emulsion | >240 min. | 1 min. | 4 min. | >240 min. |

Reference (1), in which the emulsion was gelatinized and the mechanical stability was as low as 1 min., did not provide a spinning liquid sufficient for the purpose.

Reference (2) emulsion, of which the storage stability was relatively good but the mechanical stability was as poor as 4 min., and did not provide a spinning liquid of sufficient quality.

Reference (3) emulsion was fairly good both in the storage and in the mechanical stability.

Further, the stability of the spinning liquid in reference (3) was expressed in terms of viscosity, that is 12 sec. immediately after preparation, and 15 sec. after 24 hours, increasing gradually with the elapse of time, while the viscosity of the spinning liquid of this invention remained constant, i.e., 11 sec. after the preparation and even after 24 hours. The viscosity was expressed by the time in seconds during which a steel ball of ⅛ inch diameter falls a distance of 30 cm in the spinning liquid at 75°C.

The spinning liquids of the present invention and of the reference (3) were extruded after filtration into an aqueous 350 g/l solution of sodium sulfate to make fibers and then introduced into a 300 g/l bath of sodium sulfate at 90°C for the wet thermal treatment, then washed with water and dried, stretched at 150°C and subjected to a thermal treatment at 230°C. The fibers thus produced were treated for 30 min. at 70°C to be converted into acetal in a bath which contained 5.0 parts of formaldehyde, 15 parts of sulfuric acid, 10 parts of sodium sulfate and 70 parts of water.

Table 1 shows, with respect to the 2 denier fibers of this invention, mechanical properties, uniformity of cross-section, luster, dyeability, heat resistance and dry-hot contraction.

Table 1

| Sample<br>Item tested | Fibers of this invention | Fibers of the reference |
| --- | --- | --- |
| Dry strength (g/d) | 3.25 | 2.96 |
| Dry stretching (%) | 23.7 | 23.5 |
| Knotting strength (g/d) | 1.45 | 1.30 |
| Uniformity of cross-section | uniform | Dual structure having skin and core |
| Luster | with transparency | milky white |
| Dyeability | clear | slightly lack of clearness |
| Thermal coloration | | |
| 140°C × 120' | 75 | 68 |
| 150°C × 60' | 62 | 45 |
| Dry-hot contraction(%) | | |
| 190°C × 20' | 5 | 13 |

As for the heat resistance, the thermal coloration was of a lesser degree at a temperature above 150°C, and, with respect to other mechanical properties, uniformity of the cross-sections, luster, dyeability and the dry-hot contraction too, fibers of this invention exhibited a substantially improved effect in comparison with the reference fibers.

Remarks:
1. Uniformity of cross-section was measured from an electron microscopic photogram.
2. Luster of fibers was estimated by visual observation of the fibers.
3. For dyeing, 1% owf (on the weight of fiber) of basic dye Sumiacryl Basic Pink B from Sumitomo Chemical Products, 2% owf of acetic acid, and 0.5% owf of sodium acetate was used. Dyeing was carried out for 60 min. in a dyeing bath of a bath ratio of 1:40 at 90°C.
4. Dry-hot contraction was measured for 20 min. under a temperature of 190°C in the absence of tension in an oven.

EXAMPLE 2

A spinning liquid was prepared by adding a 15% aqueous solution of PVA as a matrix to the PVC emulsion in Example 1 in the same manner as in Example 1 so that the PVA amounted to 30, 40, 100, 200, 250 and 300% by weight to the total polymer components in the emulsion. The fibers from the spinning liquid were stretched and thermally fixed as in Example 1 and converted into the acetal to produce fibers of 5 denier.

Properties of the fibers thus produced are shown in Table 2.

If the PVA content was decreased down below 40%, the incomplete effect of the matrix that occurred made it impossible to spin the composition. On the other hand, with the PVA content exceeding 250%, incomplete continuity of the PVC emulsion results and luster and dyeability are remarkably hindered.

It is understandable from the foregoing statements that the object of this invention can be attained only in the range of PVA as matrix extending from about 40 to 250% by weight to the total polymer components in the emulsion.

Table 2

| Sample<br>Item | Fibers for reference | | Fibers of this invention | | | Fibers for reference |
| --- | --- | --- | --- | --- | --- | --- |
| PVA (%) /polymers in emulsion | 30 | 40 | 100 | 200 | 250 | 300 |
| Spinnability | No | | Good | | | Good |
| Continuity of emulsion particles | — | | Perfect | | | Imperfect |
| Luster | — | | Transparent | | | Milky white |
| Dyeability | — | | Clear | | | Slightly not clear |

Remarks: Continuity of the emulsion particles was observed with fibers placed on a deck glass which were treated with a few drops of 80 to 90% formic acid, heated to 60° to 80°C on a metal plate and dissolved in PVA, using a microscope. Completely continuous particles in the emulsion could be observed as a net-work fibril and, on the other hand, incompletely continuous particles were observed as discontinuous particles and stretched particles.

EXAMPLE 3

A mixture consisting of 5.5 parts of a sulfone group containing a PVA derivative of the degree of polymerization 200 and the degree of saponification 98.0% by moles which had been obtained by saponifying a sodium allylsulfonatevinyl acetate copolymer containing 10.0% by moles of allylsulfonic acid, 1.92 parts of sodium dodecylbenzenesulfonate, 0.30 part of ammonium persulfate, 196 parts of vinyl chloride, 22 parts of vinyl acetate and 460 parts of desalted water was placed in an autoclave and the polymerization was carried out for 6 hours under stirring at temperatures up to 50°C. The emulsion thus obtained of vinyl chloride-vinyl acetate copolymer contained solid matter amounting to 31.8% by weight (31.5% by weight of the total polymer components), and possessed a viscosity of 9.1 cp at 25°C, the average particle size being 44mμ. The mechanical stability was greater than 4 hours and the storage stability was so excellent that no change in appearance was observed after a lapse of 6 months.

To 28.3 parts (polymer components 8.9 parts) of the vinyl chloride-vinyl acetate copolymer emulsion, 60 parts of a 15% aqueous solution of PVA (polymer component 9 parts; 2000 of polymerization degree, 98.5% by moles of saponification degree) and 2.5 parts of a 16% stannic acid dispersion as an anti-inflammation agent were added, and the resulting mixture was thoroughly mixed, maintained at 80°C for debubbling, to prepare a spinning liquid. The polymer components in the matrix amounted to 100.1% by weight to the polymer components in the emulsion. The stability of the spinning liquid obtained in the above procedure was compared with that of the reference spinning liquid which had been prepared from the vinyl chloride-vinyl acetate copolymer emulsion using PVA instead of a PVA derivative containing sulfone groups and 9.6 parts of an emulsifying agent since 1.92 parts of the emulsifying agent was not sufficient to give the necessary mechanical stability to the emulsion and a satisfactory spinning liquid. The stability was expressed by the viscosity of the spinning liquid; thus, the viscosity of the reference spinning liquid increased with time was 12 and 15 sec., immediately and 24 hours, respectively, after the preparation, while the spinning liquid of this invention maintained a stability of 10.5 sec. for as long as 24 hours, thereby demonstrating extremely excellent stability.

The spinning liquid, after filtration, was spun into fibers in an aqueous solution containing 350 g/l of sodium sulfate at 45°C, which were then treated by wet thermal treatment in a bath of 300 g/l of sodium sulfate at 90°C, washed with water, dried, stretched at 150°C and thermally treated at 230°C. The fibers thus obtained were converted into the acetal by being treated for 30 min. in a bath consisting of 5 parts of formaldehyde, 15 parts of sulfuric acid, 10 parts of sodium sulfate and 70 parts of water. The heat resistance of the 2 denier fibers of this invention was comparatively examined with that of the reference fibers prepared in the similar process.

As in the case of Example 1, the heat resistance of the fibers of this invention was so excellent that thermal discoloration and thermal contraction were far less and the effect was exhibited more remarkably at temperatures above 150°C. Similarly, with respect to mechanical properties, homogeneity of cross sections, luster and dyeability, the fibers of the present invention showed further improved properties than the reference fibers did, as is shown in Table 3.

Table 3

| Sample<br>Item tested | Fibers of this invention | Fibers of reference |
| --- | --- | --- |
| Dry strength g/d | 3.20 | 2.88 |
| Dry stretching % | 23.6 | 23.8 |
| Knotting strength g/d | 1.48 | 1.33 |
| Cross-sectional homogeneity | good | dual structure of skin and core |
| Luster | looks transparent | milky white |
| Dyeability | clear | slightly less clear |
| Thermal coloration | | |
| 140°C × 120' | 76 | 70 |
| 150°C × 60' | 64 | 45 |
| Thermal contraction in air, % | | |
| 190°C × 20' | 6 | 12 |

EXAMPLE 4

A mixture consisting of 10.9 parts of a PVA derivative containing 1.0% by moles of sulfone groups and of the degree of polymerization 300 which had been prepared by sulfonating with sodium hydrogen sulfite, completely saponified PVA as the PVA derivative containing sulfone groups, 0.96 part of sodium dodecylbenzenesulfonate, 0.26 part of potassium persulfate, 460 parts of desalted water, and 218 parts of vinylidene chloride was placed in an autoclave, and polymerization was carried out for 10 hours at 45°C. The emulsion of polyvinylidene chloride contained 31.4% by weight of solid matter (31.2% by weight of the polymer components). The viscosity was 12.3 cp at 25°C, and the average particle size was 85 mm. Mechanical stability exceeded 4 hours and the storage stability was so large that no charge was observed after 6 months.

To 28.6 parts (polymer components 8.92 parts) of the said polyvinylidene chloride emulsion, 48 parts of a 15% aqueous solution of PVA (polymer component 7.2 parts; polymerization degree of 1000 98.0% by moles of saponification degree) and 12 parts of a 15% aqueous solution of polyacrylamide (polymer component 1.8 parts) were added, thoroughly mixed then debubbled and maintained at 80°C to prepare a spinning liquid. (The polymer components in the matrix amounted to 100.8% by weight to the polymer in the emulsion.) Viscosity of the spinning liquid was 11 and 12 sec. immediately and 24 hours after preparation, respectively, and exhibited excellent stability.

The said spinning liquid after filtration, was spun into a 350 g/l aqueous solution of sodium sulfate to prepare fibers. The fibers were then introduced into a 300 g/l bath of sodium sulfate at 90°C for wet thermal treatment, washed with water, dried, stretched at 150°C and finally thermally treated at 230°C. The fibers thus obtained were converted into the acetal by being treated for 30 min. at 70°C in a bath consisting of 5 parts of formaldehyde, 15 parts of sulfuric acid, 15 parts of sodium sulfate and 70 parts of water.

The fibers of the present invention thus prepared exhibited particularly excellent properties in heat resistance, mechanical properties, luster and dyeability.

On the other hand, however, an emulsion of polyvinylidene chloride prepared as a reference which had been prepared in a similar manner using PVA instead of the sulfone-containing PVA derivative contained larger particles of average particle diameter 230 mμ, and the storage stability was not as good and deposited a considerable amount of precipitate 2 days after the polymerization, so that a satisfactory spinning liquid could not be expected therefrom.

EXAMPLE 5

A mixture consisting of 10.9 parts of sodium salt of PVA converted into the sulfuric acid ester of the degree of polymerization 500 and containing 5.0% by moles of sulfate groups produced by treating a completely saponified PVA with sulfuric acid, 0.30 part of ammonium persulfate, 460 parts of desalted water, 153 parts of vinyl chloride and 65 parts of vinylidene chloride was placed in an autoclave and the polymerization was carried out for 7 hours under stirring at temperature up to 50°C. The copolymer emulsion of poly (vinyl chloride-vinylidene chloride) contained 31.6% by weight of solid matter. (The polymer components amounted to 31.6% by weight.) Viscosity was 9.7 cp at 25°C and average particle diameter was 148 mμ. The mechanical stability was more than 4 hours and the storage stability was so large that no change was observed even after a lapse of 6 months.

The 28.6 parts (polymer components 9.04 parts) of the said copolymer emulsion of poly (vinyl chloride-vinylidene chloride), 60 parts of a 15% aqueous solution of PVA (polymer component 9 parts; 1700 of polymerization degree, 99.5% by moles of saponification degree) were added together and thoroughly mixed. The resulting mixture was maintained at 80°C for debubbling and a spinning liquid was prepared.

(The polymer components in the matrix amounted to 99.6% by weight to the polymers in the emulsion.) Stability of the spinning liquid of the present invention was comparatively examined with that of the reference liquid, which had been prepared in a similar manner from a copolymer emulsion of poly (vinyl chloride-vinylidene chloride) produced by polymerization in the presence of 9.6 parts of sodium laurylsulfate as an emulsifying agent and using PVA instead of the PVA derivative containing sulfate groups. On expressing the stability in terms of viscosity of spinning liquids, viscosity of the liquid for reference was 13 and 16 sec. immediately and 24 hours, respectively, after preparation, increasing with time, while the spinning liquid of this invention possessed an excellent stability of 11 sec. steadily even after 24 hours.

The spinning liquid, after filtration, was extruded through a 0.2 mm slit into a 350 g/l aqueous solution of sodium sulfate to make films, the films prepared were passed through a bath of a saturated solution of sodium sulfate of which the temperature was gradually elevated from 70° to 95°C, and then through a 100 g/l aqueous solution of sodium sulfate at 30°C, cooled and washed with cold water. Further, the product was stretched to twice its length at 100° to 160°C.

The films thus prepared were transparent and excellent in mechanical properties. As for the heat resistance, the films of the present invention was less colored by heat than the films for reference which were prepared in a similar process, and the effect was especially remarkable at temperatures above 150°C. Other films of this invention prepared by casting the said liquid on an endless belt at 50° to 80°C, and evaporating water followed by stretching to twice the length at a temperature 100° to 160°C were as excellent as the previous ones in transparency, mechanical properties and heat resistance.

EXAMPLE 6

A mixture consisting of 17.4 parts of a PVA derivative containing sulfone groups of the degree of polymerization 350 and the degree of saponification 99.5% by moles which had been prepared by saponifying sodium methallylsulfonate-vinyl acetate copolymer containing 3.5% by moles of the sodium methallylsulfonate, 0.1 part of potassium persulfate, 0.05 part of sodium hydrogen sulfite, 205 parts of vinyl chloride, 13 parts of propionic acid vinyl ester and 420 parts of desalted water was placed in an autoclave and the polymerization was carried out for 3 hours under stirring at a temperature up to 50°C. The copolymer emulsion of poly (vinyl chloride-propionic acid vinyl ester) prepared in this manner contained 35.8% by weight of solid matter (the polymer component amounted to 35.8% by weight). The viscosity was 12.5 cp at 25°C, and the average particle diameter was 148 mµ. The mechanical stability was more than 4 hours and the storage stability was so excellent that no change was observed after a lapse of 6 months.

To 28 parts (polymer components 10.0 parts) of the copolymer emulsion of poly (vinyl chloride-propionic acid vinyl ester), 100 parts of a 15% aqueous solution of PVA (polymer component 15 parts; 1400 of polymerization degree, 96.0% by moles of saponification degree) and 2.5 parts of a 16% dispersion of tin oxide (SnO$_2$) were added. The resulting mixture was thoroughly mixed, kept at 80°C and debubbled, to prepare a spinning liquid. The polymer component in the matrix amounted to 150% by weight to the polymer components in the emulsion. The viscosity of the spinning liquid of this invention was 16 sec. immediately after preparation, and the same value remained even after 24 hours, holding excellent stability.

In the same manner as in Example 1, the said spinning liquid was treated successively by spinning, wet thermal treatment, drying stretching, thermal treatment and converting into acetal.

The fibers obtained excellent properties in heat resistance, mechanical properties, luster and dyeability.

EXAMPLE 7

The 2 denier staple fibers (the cut length 38 mm) of this invention obtained in Examples 1 and 3 were processed into spun yarn with cotton yarn number 20 and number of twist 15/inch using a Shirley Miniature Spinning Plant (supplied by Platt International Ltd.). The yarn strength of the obtained spun yarns was 0.463 kg and 0.450 kg. for the yarns in Examples 1 and 3, respectively. The spun yarns prepared from the fibers of this invention were more excellent in heat resistance, mechanical properties, luster and dyeability than the yarns from the fibers for reference.

Note: The yarn strength of spun yarn was estimated by JIS L1067 (corresponding to ASTM D 2256-69).

EXAMPLE 8

Using the spun yarn with cotton yarn number 20 of this invention prepared in Example 7, plain woven clothes were made with number of warps 55/inch and number of wefts 60/inch having a weight of 130 g/m$^2$. The tensile strengths of the clothes were as follows:

| | Example 1 | Reference 3 in Example 1 | Example 3 | Reference in Example 3 |
|---|---|---|---|---|
| Longitudinal | 27.6 Kg | 23.4 Kg | 26.2 Kg | 23.0 Kg |
| Lateral | 48.0 | 40.8 | 45.8 | 40.2 |

The clothes produced from the spun yarn of this invention exhibited better properties in heat resistance, mechanical properties, luster and dyeability, as they are characteristic to the fibers of this invention, than those prepared from the reference fibers in Examples 1 and 3. Further, clothes woven using the spun yarn from the fibers in Example 3 that contained the fire-retardant showed high efficiency in avoiding inflammation and passed the vertical direction test in accordance with DOCFF 3-71.

Note: The tensile strength of clothes was measured according to JIS L1068 (corresponding to ASTM D1682-64).

What is claimed is:
1. A process for preparing fibers or films composed of
   (a) polyvinyl alcohol having a polymerization degree of from 900 to 2500,
   (b) a polyvinyl alcohol derivative having a polymerization degree from 100 to 1000 containing from 0.5 to 20% by moles of sulfonic acid or sulfate groups, said polyvinyl alcohol derivative being obtained by saponifying a copolymer produced from vinyl acetate and a sulfonic acid group bearing polymerizable monomer selected from the group consisting of vinylsulfonic acid, allylsulfonic acid, methallylsulfonic acid, and salts thereof, or is ob- tained by treating polyvinyl alcohol with one member selected from the group consisting of bromine and iodine and heating the thus treated polyvinyl alcohol in an aqueous solution of sodium hydrogen sulfite or is obtained by heating polyvinyl alcohol in a concentrated aqueous solution of sulfuric acid, and (c) a chloride containing a vinyl polymer formed from chloride containing monomers selected from the group consisting of vinyl chloride, vinylidene chloride, and copolymers thereof with another polymerizable vinyl monomer which does not contain chloride and which is present in an amount not more than 15% by weight, a part of the cloride containing vinyl polymer being grafted on to the polyvinyl alcohol derivative, the content of said polyvinyl alcohol being 40 to 250% by weight based on the weight of (b) and (c), and the content of said polyvinyl alcohol derivative being 1.5 to 20% by weight of (b) and (c), the content of said chloride containing vinyl polymer being 80 to 98.5% by weight of (b) and (c) which comprises:

forming an aqueous emulsion by emulsion polymerization of said chloride-containing vinyl monomer in the presence of a polymerization catalyst and a polyvinyl alcohol derivative containing from about 0.5 to 20% by moles of sulfonic acid or sulfate groups in an amount of about 1.5 to 20% by weight of the total polymer components in the emulsion and adding said emulsion to a 14 to 20% by weight aqueous solution of said polyvinyl alcohol as a matrix that corresponds to 40 to 250% by weight of the total of said polyvinyl alcohol derivative and said chloride-containing vinyl polymer, a part of said chloride-containing vinyl polymer, a part of said chloride-containing vinyl polymer being grafted onto said polyvinyl alcohol derivative in the emulsion and then coagulating the polymers in the resulting mixture to form fiber or film.

2. The process of claim 1, wherein stannic acid or tin oxide in the form of aqueous dispersion is added to the resulting mixture in an amount of not more than 5% by weight calculated on said polymers.

3. The process of claim 1, wherein the chlorine-containing vinyl polymer is polyvinyl chloride.

4. The process of claim 2, wherein the chlorine-containing vinyl polymer is polyvinyl chloride.

5. The process of claim 1, wherein the chlorine-containing vinyl polymer is a copolymer of vinyl chloride and vinylidene chloride.

6. The process of claim 2, wherein the chlorine-containing vinyl polymer is a copolymer of vinyl chloride and vinylidene chloride.

7. The process of claim 1, wherein the chlorine-containing vinyl polymer is a copolymer of vinyl chloride and vinyl acetate or propionic acid vinyl ester.

8. The process of claim 2, wherein the chlorine-containing vinyl polymer is a copolymer of vinyl chloride and vinyl acetate or propionic acid vinyl ester.

9. The process of claim 1, wherein the polymerization catalyst is a peroxide selected from the group consisting of ammonium persulfate, potassium persulfate and hydrogen peroxide, or a redox catalyst composed of one of said peroxides and a reducing agent.

10. The process of claim 1, wherein the film or fiber is formed by coagulation of the emulsion and matrix in an aqueous solution of sodium sulfate.

11. The process of claim 2, wherein the film or fiber is formed by coagulation of the emulsion and matrix in an aqueous solution of sodium sulfate.

12. The process of claim 10, wherein said fibers or filsm produced are heated in an aqueous solution of sodium sulfate at 70° to 100°C.

13. The process of claim 11, wherein said fibers or films produced are heated in an aqueous solution of sodium sulfate at 70° to 100°C.

14. The process of claim 12, wherein the fibers or films produced are dried, stretched, and then subjected to a thermal treatment.

15. The process of claim 13, wherein the fibers or films produced are dried, stretched, and then subjected to a thermal treatment.

16. The process of claim 14, wherein the fibers or films produced are converted into an acetal with an aldehyde.

17. The process of claim 15, wherein the fibers or films produced are converted into an acetal with an aldehyde.

* * * * *

UNITED STATES PATENT OFFICE
CERTIFICATE OF CORRECTION

Patent No. 3,962,398      Dated June 8, 1976

Inventor(s) Kazuto Matsuo et al

It is certified that error appears in the above-identified patent and that said Letters Patent are hereby corrected as shown below:

-- In column 17 of the patent, line 35, delete "said chloride-containing vinyl polymer, a part of", in column 18, line 27, change the "filsm" to "films"--.

Signed and Sealed this

Eleventh Day of January 1977

[SEAL]

Attest:

RUTH C. MASON
*Attesting Officer*

C. MARSHALL DANN
*Commissioner of Patents and Trademarks*